March 26, 1968 C. A. BURKE ETAL 3,374,639
LEAK DETECTION AND PRESSURE RELIEF SYSTEM FOR
INSULATED LIQUEFIED GAS STORAGE TANKS
Filed Oct. 25, 1966 7 Sheets-Sheet 1
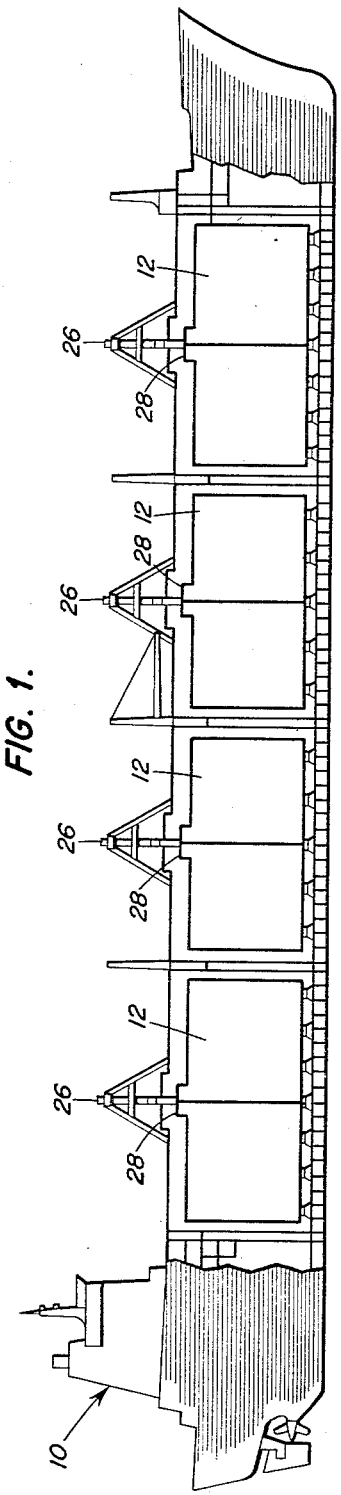
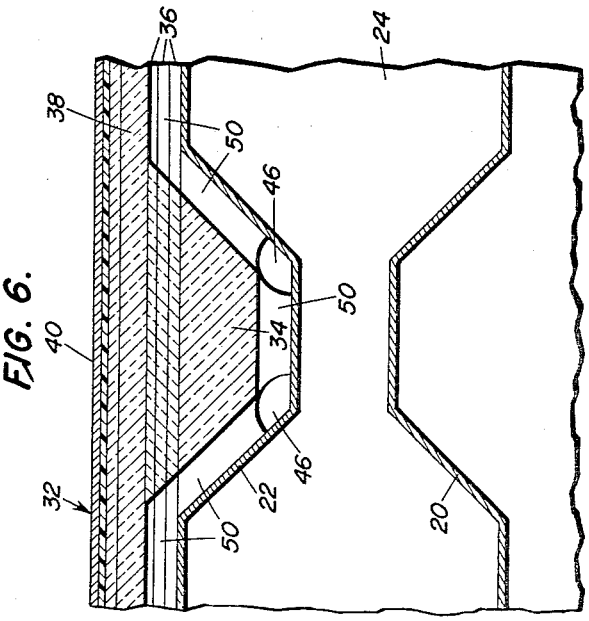
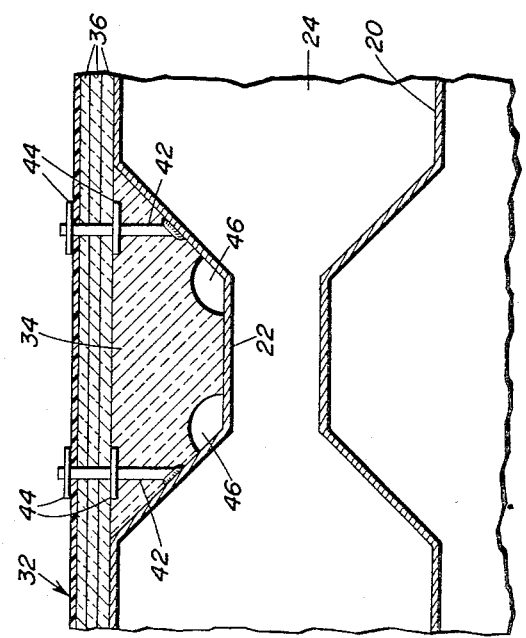
INVENTORS
CHARLES A. BURKE,
JOHN E. GALE,
NORMAN K. BASILE
BY *Stevens, Davis, Miller & Mosher*
ATTORNEYS

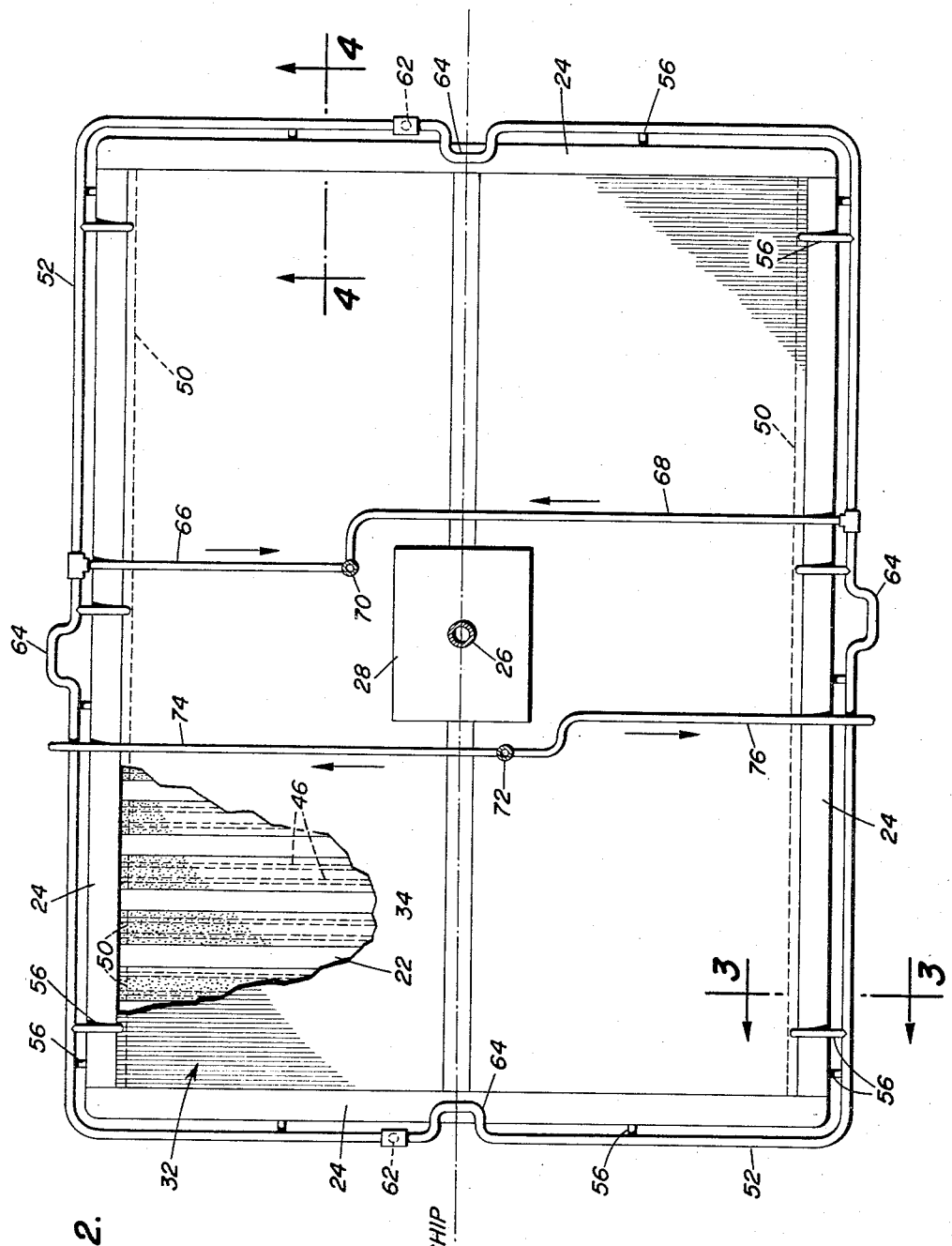

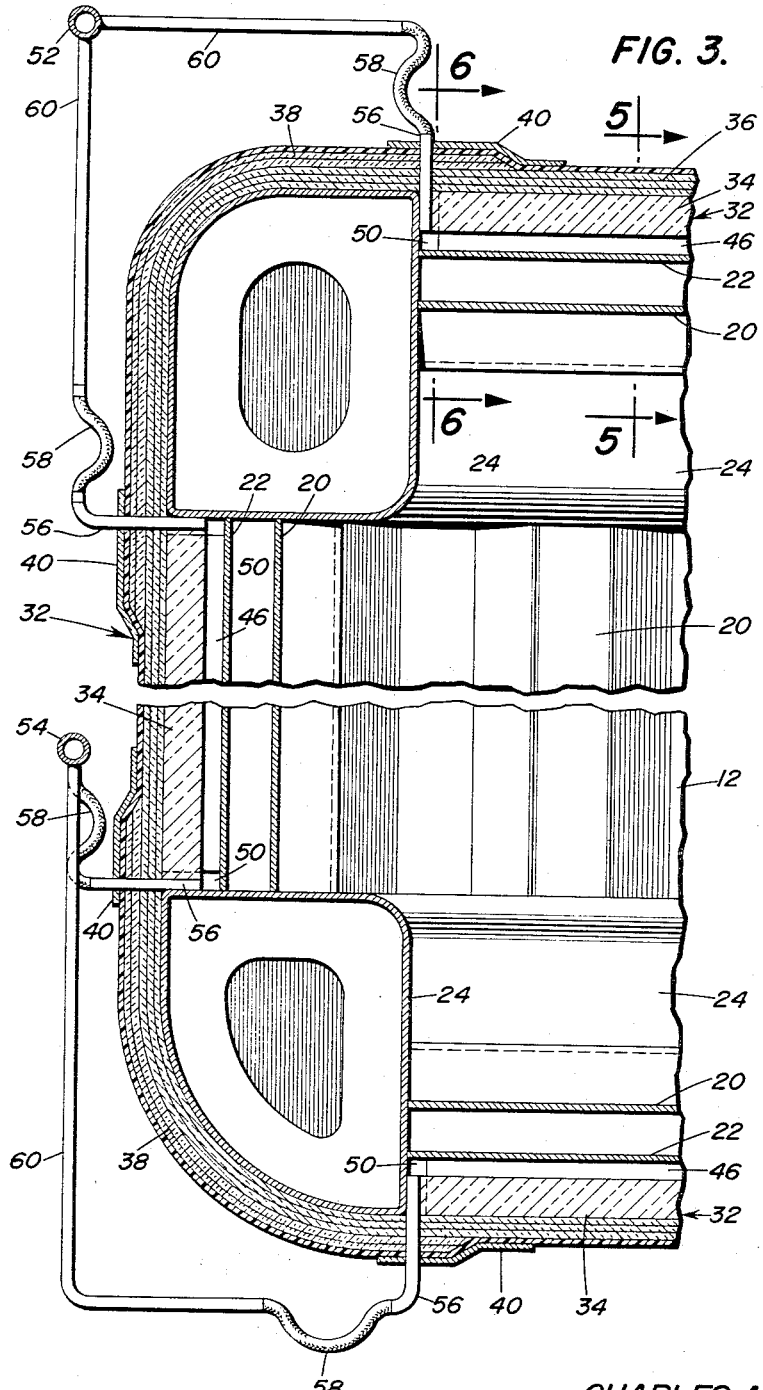

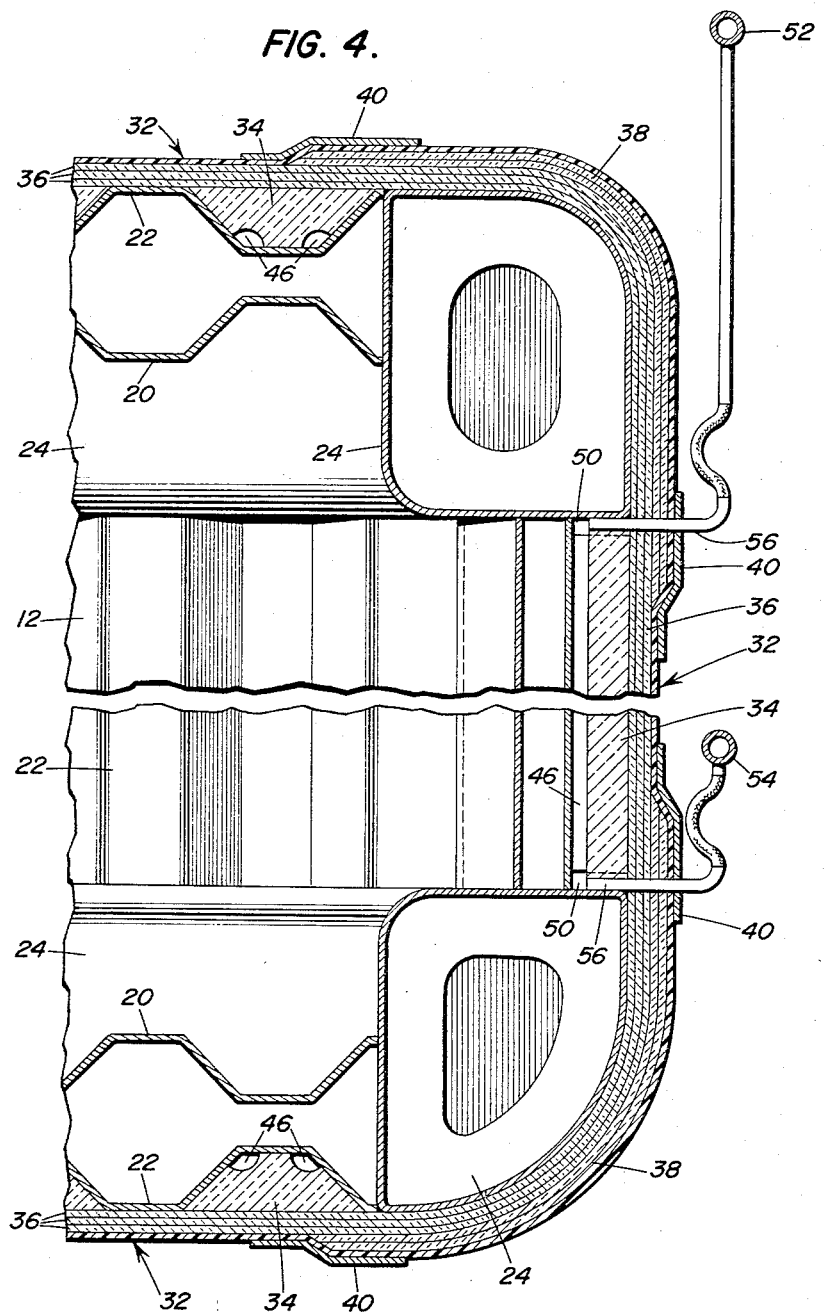

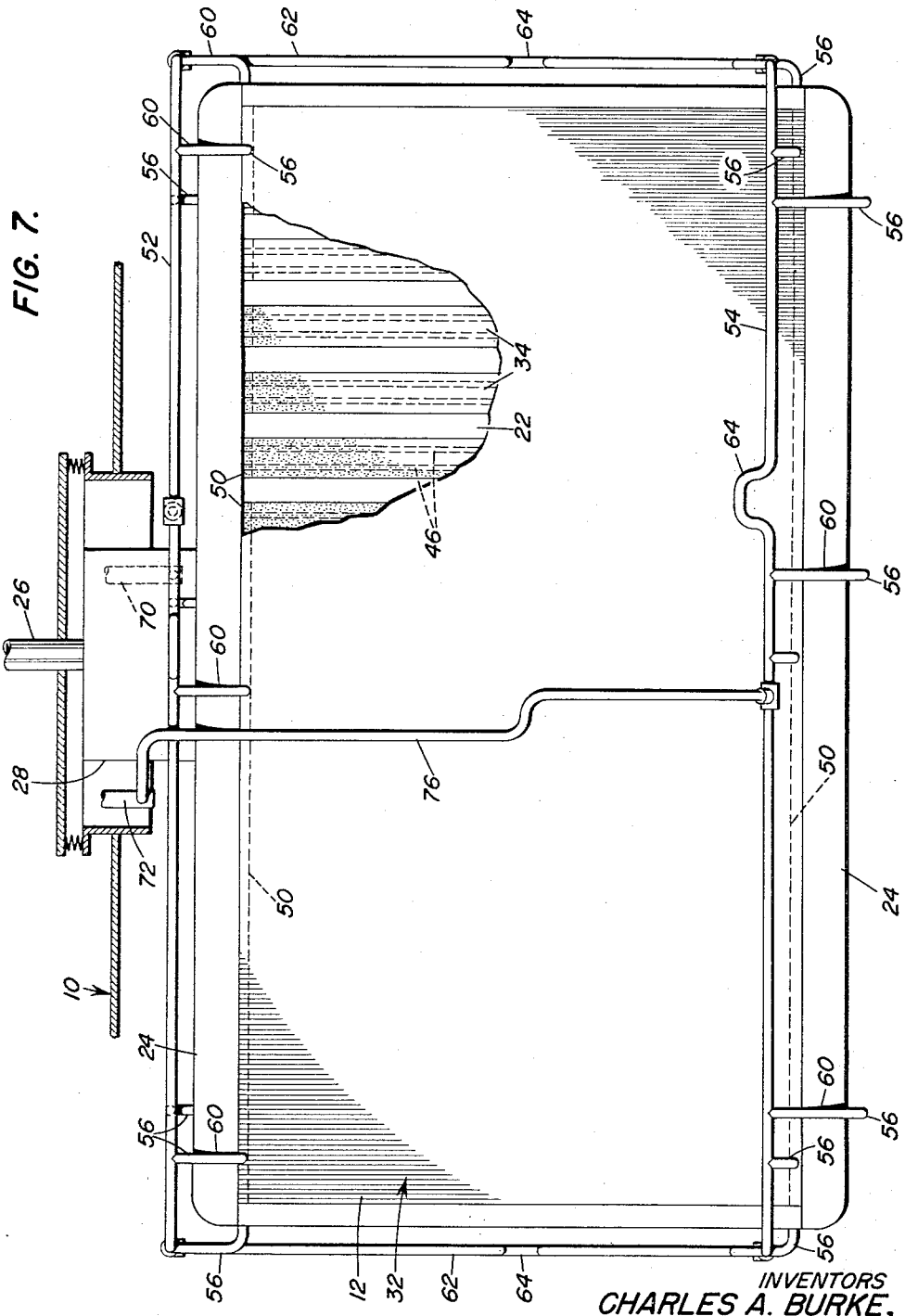

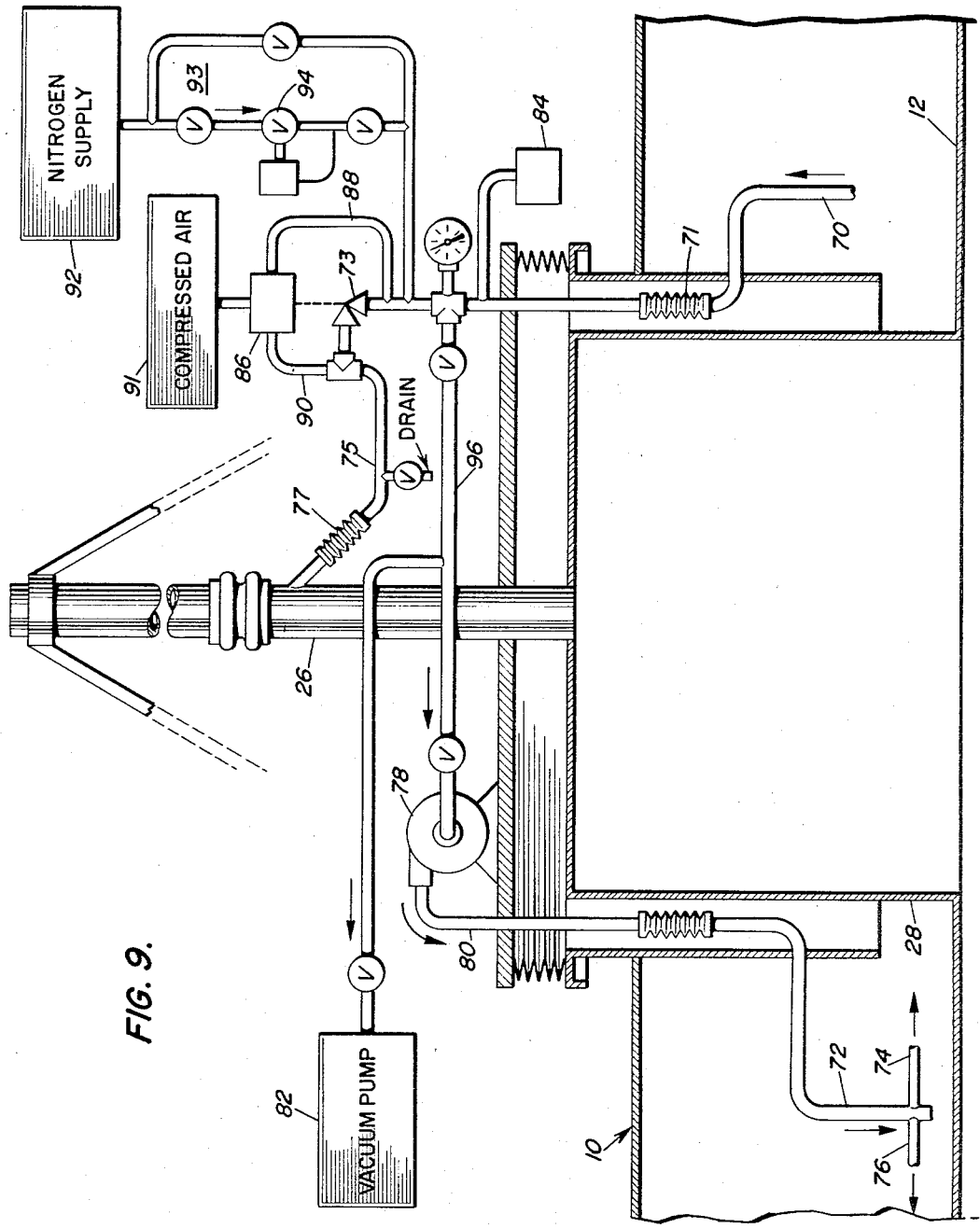

United States Patent Office 3,374,639
Patented Mar. 26, 1968

3,374,639
LEAK DETECTION AND PRESSURE RELIEF SYSTEM FOR INSULATED LIQUEFIED GAS STORAGE TANKS
Charles A. Burke and John E. Gale, Staten Island, and Norman K. Basile, Bronx, N.Y., assignors to John J. McMullen, Montclair, N.J.
Filed Oct. 25, 1966, Ser. No. 589,360
13 Claims. (Cl. 62—45)

ABSTRACT OF THE DISCLOSURE

A tank for storing liquefied gas or the like at about ambient pressure including an outer coating of thermal insulation in which gas conveying grooves are formed against the outer surface of the tank. The insulation is gas impervious. In the event of leakage through the tank wall, vapors are conveyed through the insulation grooves to various header grooves and thereafter conveyed away from the tank so as to prevent pressure buildup behind the insulation and resulting damage thereto. A gas analyzer is provided to detect the gas within the grooves so that if cargo gas appears, a tank leak condition is indicated.

---

The present invention relates to a novel tank construction for carrying a cryogenic fluid such as liquefied gas at about ambient pressure, and more particularly, to a leak detection and pressure relief system for tanks of this type.

In the transportation of cryogenic fluid such as liquefied gas, various tank configurations have been designed including free standing flat and corrugated plate and single and double wall tanks supported either above or upon a bed of thermal insulation within the hull of the transport ship. With any design, steps must be taken to protect the soft carbon steel forming the ship's hull from the low temperatures of the tank and contents thereof. One such technique involves lining the inner walls and bottom of the hull with layers of insulation spaced from the outer walls of the tank. Recent developments include the new technique of hanging layers of insulation completely about the outer walls of the tank and spaced from the hull sides and ship bottom. Such an arrangement is disclosed in the co-pending patent application entitled, "Novel Insulated Tank Configuration," by Thomas F. Bridges et al., Ser. No. 539,489, filed Apr. 1, 1966, and assigned to the present assignee and incorporated here by reference.

In regard to this new design, there has been discovered the possibility that cracks developing in the tank walls could result in a leakage therethrough of gas and the entrapment thereof behind the innermost layers of insulation. With time, this gas may expand creating pressures which force the adjacent layers of insulation away from the outer tank wall. In the extreme case, it is conceivable that the insulation may be torn or broken from the wall leaving portions of the wall exposed to the mild steel ship supporting structure. This exposure creates a dangerous situation for the reason that the ship's supporting structure cannot withstand the cold cryogenic temperatures associated with the tank.

It is an object of the present invention to provide means within the layers of insulation hung about the outer wall of a tank of any configuration, said means serving to channel any escaping gas to a predetermined zone where it can be removed so as to avoid the buildup of pressure between the insulation and the tank wall.

Another object of the present invention is to provide a system which continuously monitors the leak condition of the outer tank wall and actuates an appropriate alarm accordingly.

In a preferred configuration of the present invention, the inner layers of insulation form a plurality of grooves and channels into which accumulate any gas leaking through the outer tank wall. The grooves extend along the outside of the tank wall to header channels which feed through collection headers and a relief valve to a blow-off mast. Of added advantage, a gas analyzer is located in the circulation pipe giving immediate indication of the leak condition of the outer tank wall. The detector samples a continuous flow of gas from a top collection header to determine the presence of a cargo gas leak. The sampled gas is returned to a bottom collection header. Flow is induced by a motor driven centrifugal fan located either at the tank hatch or in the fore and aft passageways below the upper deck.

Other and further advantages and objects will become apparent with the following detailed description when taken in conjunction with the appended drawings.

FIGURE 1 is a side elevation with parts broken away of a ship according to the present invention.

FIGURE 2 is a top plan view of one of the tanks according to the present invention.

FIGURE 3 is a partial vertical transverse section taken along line 3—3 of FIGURE 2.

FIGURE 4 is a partial vertical longitudinal section taken along line 4—4 of FIGURE 2.

Figure 8:
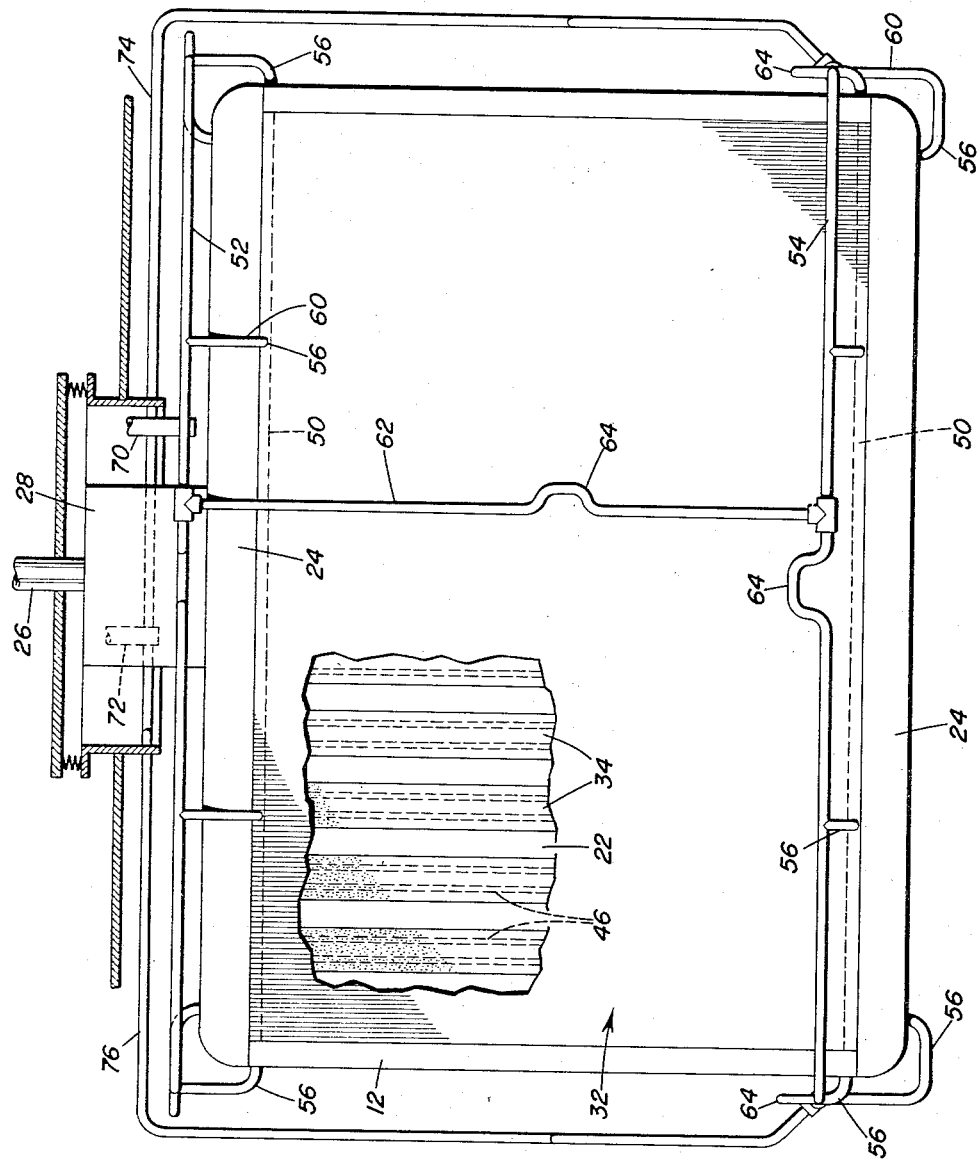

FIGURES 5 and 6 are vertical longitudinal sections taken along lines 5—5 and 6—6 of FIGURE 3.

FIGURES 7 and 8 are side and front elevations respectively of the tank of FIGURE 2.

FIGURE 9 is a diagrammatic illustration of the blow-off mast and associated control systems for the pressure relief and gas detection system.

FIGURE 1 illustrates a ship generally designated as 10 fitted with four cargo tanks 12, each being formed of a material such as aluminum or nickel-steel alloy so as to withstand cryogenic temperatures such as that of liquefied methane or the like. A blow-off mast 26 associated with each tank is mounted on the upper deck of ship 10, preferably over the central trunk 28 of the tank. Each tank is of free standing construction and is supported above the hull bottom on a plurality of insulated pillars. The preferred tank includes a double barrier design in the form of an inner wall 20 and a spaced outer wall 22 joined at the tank edges by a plurality of box girders 24. It is also preferred, but not essential for the present invention, that walls 20 and 22 be corrugated with the mutually facing corrugations aligned. The corrugations for the side walls of the tank extend vertically and the corrugations for the top and bottom of the inner and outer tanks extend athwart ship.

In order to reduce heat transfer through the tank walls, thermal insulation 32 blankets the entire outer tank wall 22. The insulation 32 includes a plurality of insulation blocks 34 with profiles shaped such that the blocks 34 fit flush within the spaces defined by the corrugations of outer wall 22. Additional layers 36 of 1-inch thick insulation cover the exposed parts of outer tank wall 22 and the face of blocks 34. Blocks 34 and layers 36 are held to the outer tank wall 22 by a plurality of projecting rods 42 extending through blocks 34 and the layers 36 and a plurality of clip washers 44 secured to rod 42. Blocks 34 and layers of insulation 36 are formed of 90% closed cellular insulation so as to prevent the passage therethrough of any gas that may leak through cracks in the outer tank wall 22. Notwithstanding the gas and impervious nature of the insulation, a vapor barrier is deposited on the outer face of the insulation 36. As better seen in FIGURES 3 and 4, a buildup of additional layers of insulation 38 is arranged at the tank edges covering box girders 24. Aluminum flashing 40 overlaps the edges of the buildup and is attached to the insulation layers 36. For further disclosure and description of the tank construction and insulation arrangement therefor, reference is made to patent application identified above.

According to the present invention, blocks 34 are cut at their innermost corners to define a pair of longitudinal grooves 46 which cooperate with the outer tank wall 22 and to form conduits which extend in the same direction as the associated corrugation. Thus, grooves 46 run athwart ship at the top and bottom of the tank and vertically along the sides of the tank.

With reference to FIGURE 2, the grooves along the top and bottom of the tank dead end in a location near the ship's center line. Although part of blocks 34 and insulation 36 abut the box girders, the end blocks 34 and layers of insulation 36 are cut away to form a header grooves 50 which are defined on one side by part of the associated box birder 24. As better seen in FIGURE 6, each header groove 50 runs along the profile of the outer tank wall 22. The outboard ends of grooves 46 at the top and bottom of the tank communicate with and feed ino the longitudinal extending header grooves 50. Transverse grooves 46 communicate with header grooves 50 which extend along the side and end walls of the tank. Although it cannot be seen from the drawings, header grooves 50 terminate at each end at a respective vertical box girder 24.

In the event there is any gas leakage through the outer tank wall 22, the leaking gas will accumulate between the insulation in the tank wall, and under its own pressure it will eventually find its way to the nearest groove 46. In this way, the gas is bled away from the source of the leak to the header grooves 50 so as to prevent a pressure buildup between the insulation and outer tank wall 22.

In order to prevent leaked gas from creeping between block 34 and insulation 36, the mutually contacting surfaces thereof may be secured together with an adhesive such as any suitable epoxy.

The tank further comprises a top collection header 52 and a bottom collection header 54 which are connected to the ship's supporting structure and extend about the periphery of the tank at its respective vertical location. As better seen in FIGURES 3 and 4, pipes 56 extend through the layers of insulation and communicate with the header grooves 50. Pipes 56 feed a flexible hose connection 58 which in turn feeds the collection headers 52 through pipe sections 60. The collection headers are fluidly connected together by a pair of vertical risers 62, one located at the forward center line of the tank and the other at the aft center line of the tank. Each riser 62 as well as the collection headers 52 and 54 are provided with expansion joints 64 to permit thermal growth as required.

At the top of the tank, a pair of pipes 66 and 68 are connected from opposite sides near the tank midline of the top collection header 52 to an outlet connection 70. An inlet connection 72 feeds a second pair of pipes 74 and 76 which extend outward across the top of the tank and down opposite sides thereof at a location near the midline of the tank. Pipes 74 and 76 are connected at their lower ends with the bottom collection header 54.

Referring now to FIGURE 9, outlet connection 70 feeds through a flexible connector 71 which in turn feeds through a differential relief valve 73, a blow-off pipe 75 with a flexible connection 77 and out through the blow-off mast 26. A centrifugal fan 78 is connected to draw through a recirculation line 96 from the input line to the pressure relief valve 73 and feed to line 80 provided with a flexible connection to the input connection 72. Cut-off valves are provided in the recirculation line generally as shown. In addition, vacuum pump 82 is also connected to the input line to fan 78 through an appropriate cut-off valve. With this arrangement, the valves can be positioned so that the fan 78 when energized draws from connection 70 and delivers to connection 72, and alternately, with fan 78 de-energized and vacuum pump 82 energized suction can be drawn from connection 70 or connection 72.

If desired, suitable connections can be included on line 96 for connecting a manometer and a pressure gauge.

In order to obtain an immediate indication of a cargo gas leak condition in the secondary barrier, a gas detector 84 is coupled to the outlet line connected to outlet connected 70. Any suitable conventional gas detector can be used and it should be understood that these detectors are well known and readily available in commerce. One suitable methane gas detectr is of the infra-red type as manufactured by Mine Safety Appliances, Inc. and will detect concentration as low as 0–50 p.p.m.±1% on a continuous basis.

The differential pressure release valve 73 is controlled by a pneumatic actuator 86 which senses the upstream-and-downstream pressure differential through lines 88 and 90 respectively. Actuator 86 is preferably set to energize or open valve 73 when the pressure differential sensed is, for example, five inches of water and reset valve 73 when the pressure differential drops to one inch of water. Actuation is accomplished by connecting a source of compressed air or the like 91 with the movable mechanism of valve 73.

A source of nitrogen gas 92 is connected to the line coupled to the outlet connection 70 through a valve system 93. Valve system 93 is capable of isolating source 92 from outlet connection 70, or alternately, if the valves are appropriately set, a pressure sensitive valve 94 connects the source 92 to the recirculation line 96 whenever the pressure therein drops below one inch of water. This action prevents an under pressure buildup in the groove system. With vacuum pump 82 energized and the appropriate valves closed, the entire system of vertical grooves 46 and groove headers 50 as well as the collection headers and associated pipes and risers can be purged or flushed with the inert gas from nitrogen supply 92. Fan 78 can be alternately used to flush the system with inert gas from supply 92 with a different valve setting.

In operation, after the system is purged with inert gas, vacuum pump 82 is de-energized and fan 78 is energized to circulate the gas through inlet connection 72, pipes 74 and 76 to the bottom collection header 54, up the vertical riser pipes 62 to the top collection header 52, through pipes 66 and 68 up through the outlet connection 70, past the gas analyzer 84 and back to the fan 78. With a no-leak condition in the outer wall 22, the pressure in circulation line 96 and grooves 46 remain between the one and five inches of water and pressure release valve 74 remains closed. If during cool down procedures, the groove pressure drops below one inch of water, valve 94 opens to supply additional volumes of inert gas.

In the event a leak condition develops in the outer tank wall 22 and cargo gas leaks therethrough, cargo gas will travel under its own pressure to the nearest groove 46 in the manner described above and then to the header groove 50 where it is withdrawn to the nearest collection header 52 or 54 where it immediately enters the circulating stream under the influence of fan 78. Gas analyzer 84 immediately detects the presence of leaked gas as soon as the same flows from connection 70 to circulation line 96, and detector 84 accordingly energizes the appropriate alarms. In this way, gas leakage through even the smallest of cracks in outer tank wall 22 is detected even though the pressure in the system has not reached five inches of water.

However, in the event the leak in outer wall 22 is substantially large with an appreciable gas leakage therethrough, pressure buildup in the appropriate grooves and collection headers may exceed five inches of water almost instantaneously with the development of the leakage and relief valve 73 is opened to relieve excess pressure through blow-off masts 26 approximately simultaneously with the indication of a cargo gas leak by gas analyzer 84. In any event, the excess pressure between the thermal insulation and the outer tank wall 22 cannot exceed five inches of water by virtue of the operation of pressure relief valve 73. As described above, this action prevents the thermal insulation from being blown or forced from the tank wall and in addition prevents the cargo gas from reaching the supporting ship's structure.

It should be understood that various modifications can be made to the herein disclosed example of the present invention without departing from the spirit and scope thereof.

It is claimed that:

1. A tank for storing liquefied gas or the like at about ambient pressure, said tank having thermal insulation contacting the walls thereof so as to prevent heat transfer through the walls of the tank, said thermal insulation being gas impervious, an elongated groove defined on an inner surface of the insulation and bounded by a part of the outer face of the tank wall, said groove being normally isolated from the interior of the tank, pipe means having one end communicating with said groove and the other end communicating with the ambient to bleed away from the tank any gas leaking through the tank wall and into said groove so as to prevent buildup between the insulation and the tank wall.

2. A tank as set forth in claim 1 wherein a plurality of said grooves are provided spaced from each other and extending throughout substantially all zones of each wall of the tank, at least some of the grooves at each wall being arranged generally parallel to each other, the insulation further defining at least one header groove on each tank wall, each header groove extending across and communicating with at least some of the plurality of said grooves, the pipe means being connected to communicate with each of said header grooves so that an excess pressure buildup of cargo gas leaking through any crack developing anywhere in the tank wall is prevented by virtue of bleeding the gas through the grooves adjacent the leak to the associated header groove and out through the pipe means.

3. A tank as set forth in claim 2 wherein a pressure relief valve is located in said pipe means, and a pressure relief valve actuator means is provided to sense the pressure within the groove system and actuate the pressure relief valve when this pressure exceeds a predetermined value.

4. A tank as set forth in claim 2 further comprising a gas analyzer connected to said pipe means to analyze any gas flowing from the grooves, said analyzer energizing an alarm whenever it detects cargo gas.

5. The tank as set forth in claim 2 wherein said pipe means comprises a first collection header and a second collection header, first pipes connected to first header grooves feeding the first collection header and second pipes communicating with second header grooves feeding the second connection header, third pipes coupling said first and second collection headers, circulation means when energized drawing gas from one of the collection headers past the gas analyzer and feeding the analyzed gas back to the other of said collection headers.

6. A tank as set for in claim 5 wherein a supply of inert gas is coupled to said circulation means through a cut-off valve system.

7. A tank as set forth in claim 6 wherein a vacuum pump is connected to the circulation means through a cut-off valve.

8. A tank as set forth in claim 6 wherein said circulation means includes a fan.

9. A tank as set forth in claim 3 wherein the pressure relief valve, when open, is connected to feed the blow-off mast for the tank.

10. A tank as set forth in claim 2 wherein the tank walls are corrugated, said insulation formed by blocks fitted within the corrugations and the blocks being cut to define one of the grooves such that the groove extends along the corrugation, additional layers of insulation secured to blanket the outer parts of the tank wall and the outer parts of the insulation blocks.

11. In combination with the tank as set forth in claim 10, a ship, said tank supported within the hull of the ship, the corrugations and grooves at the top and bottom tank walls extending athwart ship and those of the upstanding tank walls extending upward, one header groove arranged near the top of each upstanding tank wall and one header groove arranged near the bottom of each upstanding tank wall, the grooves on each wall communicating with both of the associated header grooves.

12. The tank as set forth in claim 2 wherein said pipe means includes expansion joints to permit thermal growth of the tank relative to a part of the pipe means.

13. A combination as set forth in claim 11 wherein said pipe means comprises an upper collection header communicating with the upper header grooves and a lower collection header communicating with the lower collection header grooves, a pair of riser pipes located at opposite ones of the fore and aft walls of the tank connecting the lower collection header with the upper collection header, a pair of pipes coupled from an outlet connection to opposite ones of the outboard sides of the upper collectin header, an inlet connection, a pair of pipes coupled from said inlet connection to opposite outboard sides of the lower collection header, circulation means connected from said outlet connection to said inlet connection, said tank further comprising an inner tank wall spaced from the tank outer walls to which said insulation is secured, box girders located along all edges of the tank, each groove having at least one end terminating at a box girder, and said header grooves being located adjacent a box girder.

References Cited
UNITED STATES PATENTS

| | | | |
|---|---|---|---|
| 2,922,287 | 1/1960 | Rae | 62—55 X |
| 2,927,437 | 3/1960 | Rae | 62—55 X |

LLOYD L. KING, *Primary Examiner.*